(No Model.)
B. N. DEBLIEUX.
NUT LOCK.
No. 367,196. Patented July 26, 1887.
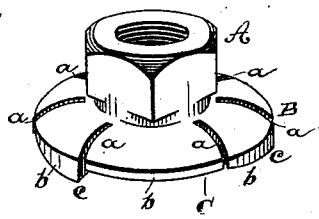
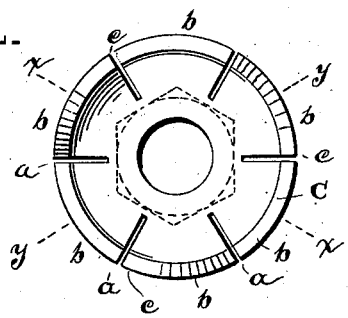
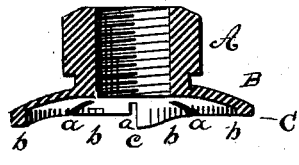
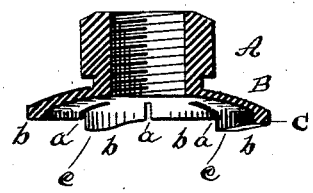
WITNESSES:
INVENTOR:
B. N. Deblieux
BY Munn & Co.
ATTORNEYS.

UNITED STATES PATENT OFFICE.

BENJAMIN NOEL DEBLIEUX, OF BAY ST. LOUIS, MISSISSIPPI.

NUT-LOCK.

SPECIFICATION forming part of Letters Patent No. 367,196, dated July 26, 1887.

Application filed December 31, 1886. Serial No. 223,146. (No model.)

*To all whom it may concern:*

Be it known that I, BENJAMIN NOEL DE-BLIEUX, of Bay St. Louis, in the county of Hancock and State of Mississippi, have invented a new and Improved Nut-Lock, of which the following is a specification, reference being had to the annexed drawings, forming a part thereof, in which—

Figure 1 is a perspective view of my improved nut-lock. Fig. 2 is an inverted plan view. Fig. 3 is a transverse section taken on line $x$ $x$ in Fig. 2, and Fig. 4 is a transverse section taken on line $y$ $y$ in Fig. 2.

Similar letters of reference indicate corresponding parts in all the views.

The object of my invention is to provide a simple and effective nut-lock which cannot become accidentally loosened, and which will yield to allow of the expansion or contraction of the bolt or body clamped by the bolt without danger of breaking or straining the bolt or nut.

My invention consists in the construction and arrangement of parts as will be hereinafter fully described and claimed.

The nut A is preferably formed integrally with the flange B, and upon the concave side of the flange B, at its periphery, is formed the rim C, projecting parallel with the axis of the nut A. The flange B is provided with radial slots $a$, which divide it up into a series of spring-arms, $b$, capable of yielding independently of each other. Upon a portion of the rim C, between alternate radial slots $a$, are formed ratchet-teeth $c$, capable of engaging the surface to which the nut is applied. The arms with ratchet-teeth are made somewhat thinner than those without, to facilitate the taking off of the nuts when desired. Although I prefer to form the ratchet-teeth upon alternate arms $b$, I may in some instances form one on each arm.

When the nut thus described is applied to a bolt and brought to bear upon the surface of the body to which the bolt is applied, the teeth $c$ are brought into engagement with the surface, and when the nut is turned down upon the bolt so as to bring the portions of the rims C carried by the arms $b$ intermediate between the ratchet teeth down firmly upon the surface, the combined pressure of all the arms will hold the work to which the nut is applied, while the ratchet-teeth will prevent the unscrewing of the nut.

The alternate or thicker arms of the concave flange B are sufficiently rigid to hold the work to which the nut is applied, while possessing sufficient elasticity to allow the bolt to contract or expand while the nut remains tight.

The rim C is of sufficient width to afford a broad bearing upon the surface to which the nut is applied, and thus prevent the cutting of the surface upon which the nut rests in the operation of turning the nut home.

The groove cut around the nut where it joins the flange is intended to aid the bending of the arms of the flange, so as to prevent breaking, and help the thinner ratchet-arms to yield more readily when the nut is put on or taken off the bolt.

Having thus fully described my invention, I claim as new and desire to secure by Letters Patent—

1. As an improved article of manufacture, a combined nut and lock comprising a nut having its inner face provided with a concave yielding locking-flange of spring material, substantially as set forth.

2. A nut and lock comprising a nut having a concave spring-flange slotted radially, substantially as set forth.

3. A nut and lock comprising a nut having a concave radially-slotted spring-flange, some of the arms thus formed being of greater thickness than the others to exert a greater force when under strain, substantially as set forth.

4. A nut and lock comprising a nut provided with a concave flange of spring material formed with a rim at its periphery projecting parallel with the axis of the nut, and radial slots extending through said rim and flange, substantially as set forth.

5. A nut-lock comprising a nut having radial spring-arms, and ratchet-teeth on the outer ends of the arms projecting parallel with the axis of the nut, substantially as set forth.

6. A nut-lock consisting of a nut provided with a concave radially-slotted flange, having a rim, C, projecting from the concave surface of the flange, and provided with ratchet-teeth $c$ upon alternating arms or sections of the flange, substantially as described.

BENJAMIN NOEL DEBLIEUX.

Witnesses:
AUGUST KELLER,
JNO. OSOINAAH.